March 24, 1931.  H. G. DRYSDALE  1,797,907
GUARD FOR CIRCULAR SAWS
Filed Jan. 26, 1926

INVENTOR
Harold G. Drysdale
BY- HAROLD G. DRYSDALE.

Patented Mar. 24, 1931

1,797,907

UNITED STATES PATENT OFFICE

HAROLD G. DRYSDALE, OF BROOKLYN, NEW YORK

GUARD FOR CIRCULAR SAWS

Application filed January 26, 1926. Serial No. 83,878.

This invention relates to circular saw guards of the kind and variety chiefly supported by the saw spindle, such as shown in United States Patent No. 1,464,924, granted August 14th, 1923, and in particular to anchoring means for such saw guards.

The principal objects of this invention are: to anchor the guard in a fixed position relative to the work table when the saw is ready for use, interfering in no way with the proper function of the guard when the saw is in use; and to mount the anchor in such a manner that its relation to the guard is maintained ready to function, whatever may be the adjustment of saw projection above the work table. Other objects of this invention are: to so design the anchoring means as to avoid interference with dust remover hoods as are frequently applied to such machines; and to anchor such guards in a uniform manner for a wide variety of machines, thereby eliminating special and costly installations and excessive parts and thus effecting economy of manufacture.

Further objects and advantages will hereinafter appear thru a study of the following specifications and accompanying drawing, in which:—

Like characters refer to like parts in both views.

Figure 2:
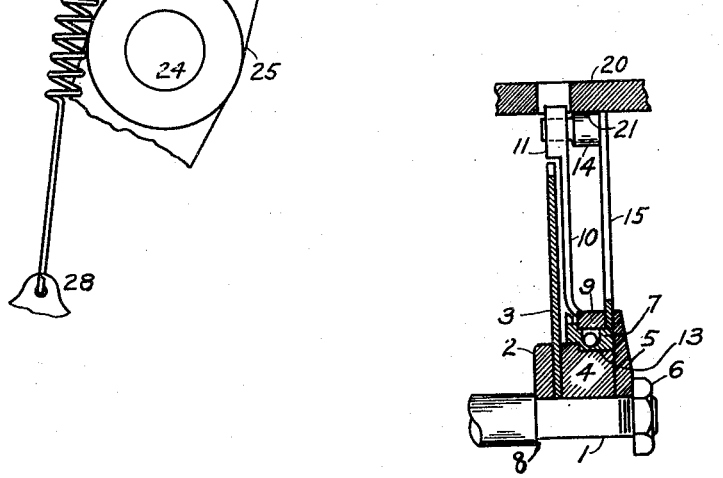
Fig. 2 is a part section on line A—A of Fig. 1 in the direction of the arrows.

In the drawing Fig. 2 the saw 3 is bound between collar 2, bushing 4, and washer 5 under pressure of nut 6 against shoulder 8 of spindle 1, all of which rotate as a unit when spindle 1 is rotated. Guard members 10 and 12 with their hubs 9 and 7 respectively are mounted and operable in the usual manner, namely the members 10 and 12 are connected together by a spring 13 embracing their hubs 9 and 7 which are rotatably mounted on the bushing 4 of saw spindle 1.

It is clear that when the spindle 1 is rotated, the guards 10 and 12 with hubs 9 and 7 have a tendency to also rotate by virtue of the friction between bushing 4 and hub 7, Fig. 2, unless an interference 14 is presented sufficient to overcome the aforesaid friction, thereby rendering the guard members 7, 9, 10, 12 motionless but allowing the saw 3, collar 2, bushing 4, washer 5 and nut 6 to turn with spindle 1.

Figure 1:
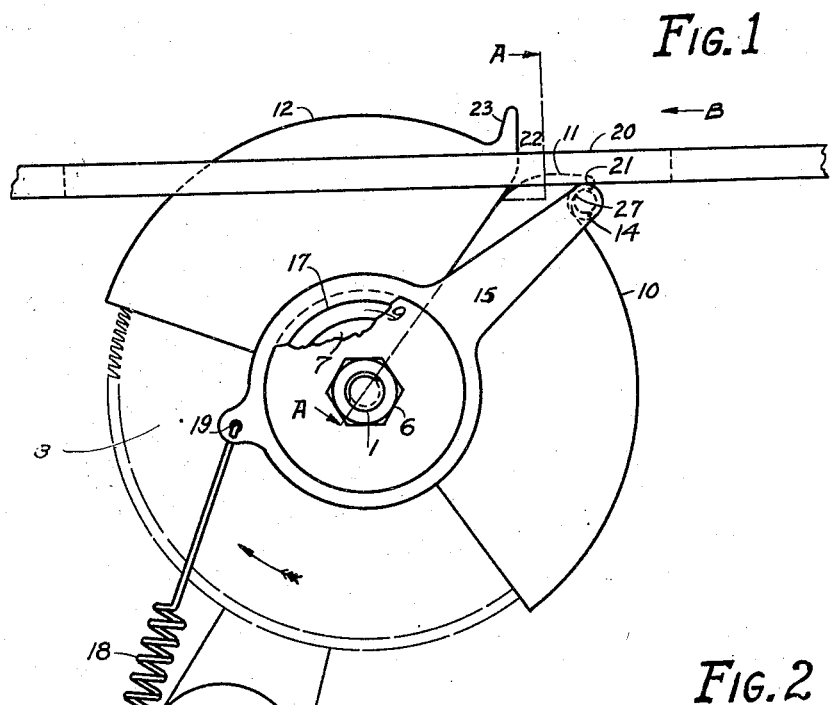
Fig. 1 is an elevation of a convenient mounting of a saw guard with a saw together with my invention as a means of anchoring the guard.

Arm 15 having a bore 17 rotatively embracing hub 7 of guard member 12 and held movably also between hub 9 and washer 5, Fig. 2, terminates in a lateral projection or pin 14 which engages a lug 11 on guard member 10. In Fig. 1 tension spring 18 engaging arm 15 as shown at 19 tends to rotate arm 15 counter to direction of rotation of saw 3 but arm 15 is of proper length to contact with underside of work table 20 at 21 thus keeping said arm in a fixed position and allowing lug 11 to bear upon pin 14 thereby preventing rotation of guard members 10 and 12 with saw 3. Arm 15 can be so proportioned with reference to the other parts that the guard members are at all times stopped in the correct position to permit use of the saw and proper function of guard.

The operation of this device when in use is as follows:—

Assume a condition with the saw turning say clockwise Fig. 1 and the guard also tending to turn with the saw as explained above but held steady by my anchoring device as before set forth. It is now desired to elevate or lower the work table 20. This may be done in the usual manner without hinderance, for as the table moves, so does the end of arm 15 with its pin 14 move with it, maintaining, therefore, its contact at 21 by a relatively small angular movement about shaft 1 and in turn changing the angular position of the guard 10 and 12 maintaining, however, the same relation of lug 11 or work entrance 22 to work table 20. It is obvious that in making lug 11 follow pin 14 and pin 14 follow work table 20, then lug 11 must follow work table 20.

When it is desired to make a cut, the work, presented to the saw in the direction of arrow B, pushes against lug 23, thereby rotating guard member 12 counter clockwise against the pressure of spring 13 until lug 23 is brought down flush with the work table when the front edge of the work emerges from the saw. When the back-edge of the work finally passes lug 11 of guard member 10 which was held with ever increasing pressure against the under side of the work by the backward rotation of member 12 which rotation has gradually stretched, and thereby increased the tension of spring 13, lug 11 leaves pin 14 at 27 and guard-member 10 follows the work until its rear edge has cleared the saw. Then, after the work has also passed the pressed-down lug 23 of guard-member 12, the friction between hub 7 and bushing 4 causes the rotating saw to carry the guards back to their former position in which lug 11 engages pin 14 of anchor 15. Arm 15 and pin 14, being held in contact 21 with work table 20 by means of anchor-spring 18, remain undisturbed.

Assume now, in case of a mounting on a saw machine carrying two saws, one saw like 3 mounted at each end of spindle carrier arm 25 equidistantly from center of shaft 24 known as a universal saw, it is desired to move the bottom saw which is not shown, but is mounted substantially as is saw 3 with guard members like 10 and 12 and anchoring device as above described, each having similar engagement points for spring 18 at 19 and 28 respectively to the top and the top saw 3 to the bottom by means of the usual operation of revolving the common spindle carrier arm 25 about shaft 24 Fig. 1. This is accomplished by swinging carrier arm 25 about shaft 24, Fig. 1, in a counter clockwise direction during which operation arm 15 slides along underside of work table 20, arm 15 assuming a changing angularity with reference to both shaft 24 and work table 20, sliding contact between arm 15 and work table 20 being maintained by anchor spring 18. It is readily seen that when the top saw 3 and its guard consisting of members 10 and 12, has passed beneath and well clear of the work table 20 a point is reached at which the arm 15 no longer contacts with the work table 20 as at 21. In such position arm 15 is still restrained from continuous rotation about spindle 1 by spring 18 Fig. 1 (the same force which previously maintained contact 21) and later, sliding contact underside of work table 20 and in this condition with the saw 3 still revolving, the contact 27 of lug 11 is maintained with pin 14 Fig. 1. The latter condition of contact 27 between lug 11 and pin 14 is no longer important but the explanation is made for a clearer understanding of the peculiar action. Thus, in a sawing machine of the type described above and known as a universal saw the resilient locking means forming the connection between the two anchors, the locking of the upper anchor against the work-table simultaneously effects the locking of the lower anchor by holding the latter in line with the pulling direction of the locking spring, so that if, in extreme positions of the spindle carrier arm, the lower saw should revolve, its guard will be prevented by its anchor from rotating with it.

A tension spring 18 is attached at 19 and 28 to arm 15 and one similar arm, both of these latter arms bearing similar relation to their respective mountings, as do 19—15—10—12 and 17. Spring 18 maintains contact at 21 when the device is in use and holds arms similar to 15 in a condition of rest when the saw at the other end of the spindle carrier arm is in use, but it is immaterial what means is employed, so long as the action is substantially as herein described. The mounting of arm 15 as shown is designed to serve most practical applications, but may be arranged in various other ways for each individual case; therefore:—

It is understood that modifications of the preferred embodiment herein described may be made without departing from the spirit and scope of my invention as claimed.

Having thus described my invention, I claim:

1. In combination with the spring-connected guard-members of a circular saw, an anchor for the said guards, having its hub mounted loosely on the saw arbor and being held in tension against the underside of the work-table of the saw by a spring; the guard-members, being likewise turnable on the saw arbor, tending to rotate with the saw, while the anchor, due to its tension, tends to turn oppositely to the rotation of the guard-members, so that a transverse pin carried at the end of the arm of the anchor, by its engagement with one of the guard-members, limits the amount of rotation of the guard-members when the arm is stopped by the work-table in the cutting position of the saw.

2. In combination with the spring-connected guard-members pivoted on the arbor of a circular saw, an anchor for the said guards consisting of a hub-member turnably carried by the said arbor, and an arm-member adapted to engage with the under side of the work-table of the saw and having a laterally projecting pin for engagement with a lug on one of the guard-members; and means for holding the said anchor-arm resiliently against the under side of the work-table when the saw is raised into cutting position.

3. In combination with the spring connected guard members of each saw of a circular saw machine having two saw arbors mounted at opposite ends of a rotatable arm, said guards turnably pivoted on the arbor of their respective saws and having a tendency to rotate with said saws, an anchor for each of said saw guards having a hub member turnably carried on the said saw arbors, each of said anchors being resiliently held from rotation by a spring and each anchor having a laterally projecting pin for engagement with a lug on one of the guard members at each end of said rotatable arm, said engagement limiting the amount of rotation of said guards when their respective anchor is not in engagement with the work table.

In testimony whereof I affix my signatuure.

HAROLD G. DRYSDALE